UNITED STATES PATENT OFFICE.

CHARLES BICKELL, OF BALTIMORE, MARYLAND.

PROCESS OF TREATING FELDSPAR FOR A MANURE.

Specification forming part of Letters Patent No. 16,111, dated November 25, 1856.

*To all whom it may concern:*

Be it known that I, CHARLES BICKELL, of the city of Baltimore, in the State of Maryland, have invented a new and useful process of treating feldspar for the purpose of obtaining therefrom potash or soda in a separate form susceptible of general use in the arts, or so that the feldspar so treated can be used as a manure, of which the following is a specification.

I have discovered that when feldspar, the common potash feldspar or orthoclase, ($KOSiO_3 + Al_2O_3 3SiO_3$,) is heated with phosphate of lime and lime, all in a finely-divided state, the phosphoric acid of the phosphate of lime unites with the potash of the feldspar, replacing silicic acid, which silicic acid unites with the lime left from the phosphate of lime, and there results phosphate of potash, ($3KOPO_5$,) lime, ($CaO$,) and double silicate of alumina and lime, ($CaOSiO_3 + Al_2O_3 3SiO_3$.) If this be lixiviated with water, then the phosphoric acid, by reason of "chemical affinity modified by insolubility," unites with the lime, releases the potash in its caustic state, and there results postash, ($KOHO$,) and a double silicate of alumina and lime, ($CaOSiO_3 + Ol_2O_3 3SiO_3$,) and phosphate of lime, ($3CaOPO_5$,) and lime, ($CaO$.) The potash can thus be obtained from its solution, either as caustic potash or carbonate of potash, by evaporation in the ordinary manner.

For the purpose of obtaining the caustic potash or carbonate of potash chemically pure any caustic lime contained in the solution can be precipitated in the ordinary manner by gradually adding a solution of carbonate of potash.

If soda feldspar or albite, ($NaOSiO_3 + Al_2O_3 3SiO_3$,) be treated with phosphate of lime and lime as above, and then lixiviated with water, there will in like manner result caustic soda, ($NaOHO$,) and the above double silicate of lime and alumina.

The advantage of my discovery and process is that either potash or soda can be obtained from feldspar easily and economically for use in the arts, or a valuable manure directly results by the process above described of heating feldspar together with phosphate of lime and lime. The advantages of such a manure will become manifest by considering what are the wants of cultivated plants, and what are the component elements of the unlixiviated mixture above obtained.

Among the substances which agricultural chemistry has pointed out as indispensable nutriments to plants are ammonia, phosphoric acid, potash, and soluble silicic acid. These substances being most wanted, soils are most apt to become deficient in them. The two former have lately been successfully supplied by means of Peruvian and Mexican guanos. For potash and soluble silicic acid, however, there has been as yet no article offered in our markets which would contain these substances in a proper form for manure. Wood-ashes, the only article of this description, cannot be obtained in sufficient quantity. In consequence of this fact most of our cultivated soils have become more or less exhausted in potash and soluble silicic acid, and agriculturalists are at a loss to improve them.

The above mixture in its unlixiviated state furnishes both potash and soluble silicic acid, and will thus form a desideratum in modern agriculture.

The mode in which this mixture supplies potash has already been explained. With reference to soluble silicic acid it must be understood that the resulting double silicate of alumina and lime is one of those silicates which contain the soluble modification of silicic acid. These silicates being soluble in acids cannot long resist to the disintegrating influence of the atmosphere, and will thus be rendered assimilable to plants. The supply of potash and soluble silicic acid are, however, not all the advantages which the above mixture offers as a manure.

On account of phosphate of lime being applied in the process for decomposing the feldspar the mixture necessarily contains also a considerable quantity of phosphoric acid, one of the above-mentioned nutriments to plants. This substance can exist in soils only in the form of phosphate of lime, a salt which is very sparingly soluble in water. To increase its solubility, and thereby render it more fit for ready assimilation, it has been proposed to apply it to soils in a state of infinite fineness, in which it could not possibly exercise much resistance against the solvent action of water. (A state of infinite fineness of solid matter is *quasi* a state of solution.) The correctness of this proposition is now amply proven by the extensive manufacture of superphosphate of lime, a substance which acts so powerfully on crops, only because it reproduces in the soil the common phosphate of lime (from which it is originally manufactured) in a state of infinite fineness. This state of things is produced in an exactly analogous manner in the above mixture.

While the superphosphate of lime acts by virtue of its soluble biphosphate of lime, which in contact with lime (in the soil) is reconverted into common phosphate of lime, the above mixture acts by virtue of its soluble phosphate of potash, which in contact with the excess of lime (in the mixture) becomes also reconverted into common phosphate of lime in the form above described.

I would also mention the property of the above mixture to fix ammonia, which is inherent to the double silicate of alumina and lime contained in it. The capacity of soils to attract ammonia from the atmosphere, as well as their power to retain it when dissolved, has been recently ascribed to portions of the double silicate of alumina and lime contained in the soils. This double salt is directly supplied by the above mixture, and its action in fixing ammonia may therefore play not the least important part in the combined action of this mixture as a manure.

The above mixture supplies therefore indirectly ammonia, and directly potash, soluble silicic acid, and phosphoric acid, the latter analogous to the manner of a superphosphate.

To enable others skilled in the arts to practice my new process, I proceed to describe in detail my mode of proceeding, both for the obtaining of potash for manufacture and incidentally the mode of preparing the mixture to be used as a manure.

I find the best proportion of the materials to be one part of feldspar, one-half part of phosphate of lime, and three to four parts of lime. Other proportions are not so economical or effective.

The feldspar should be ground as fine as mechanical means will admit. A previous calcination at a low heat will materially aid its subsequent comminution.

As to phosphate of lime, it will act satisfactorily only when used in a state of the finest subdivision, a condition in which it is offered to us by nature in the form of phosphatic guanos, (especially Mexican guano.) Mexican guano contains the phosphate of lime in a state of fineness much superior to that to which mineral phosphate of lime could possibly be reduced by mechanical means. This is especially the case if the Mexican guano contains at the same time a considerable quantity of carbonate of lime or corals, through which the particles of its phosphate of lime are then uniformly diffused, and consequently infinitely divided. Direct experiments have shown that a Mexican guano which contains, besides carbonate of lime, from twenty-five to forty-five per cent. of phosphate of lime will effect the decomposition of the feldspar most admirably. The coprolites from England will no doubt act similar to Mexican guano, for the reasons just explained.

As to lime, it should be used either in the water-slaked state or air-slaked state. Its use in either one of these conditions will save the cost of grinding and will secure its fineness.

The materials so selected and prepared should be mixed in the proportions above specified, and then placed in reverberatory or other suitable furnace and heated to a light-red heat for about two hours, more or less.

The chemical action which takes place in the above mixture when properly heated is explained by the following process: Feldspar is a double silicate of alumina and potash. In contact with phosphate of lime (under the above conditions) a double chemical decomposition ensues between the latter and the silicate of potash in feldspar, in consequence of which silicate of lime and phosphate of potash are formed. The one combines with the remaining silicate of alumina to form a double silicate of alumina and lime. The other remains as phosphate of potash until the dry mixture is lixiviated with water. At the instant of water being added the lime present at once renders the potash caustic by combining with its phosphoric acid to form phosphate of lime. From the original mixture, containing double silicate of alumina and potash, (feldspar,) phosphate of lime, and lime, (in excess,) we therefore obtain a mixture of double silicate of alumina and lime, (soluble in acids,) phosphate of potash and lime, (in excess,) which in contact with water separates into double silicate of alumina and lime, phosphate of lime, and lime (in excess) insoluble in water on one side, and caustic potash and a little caustic lime soluble in water on the other.

It is evident from the above that this mixture can be used in every respect like wood-ashes. When lixiviated with water it will furnish a solution of potash, either in the caustic or corbonated state, with small quantities of caustic lime, which latter, if it is the object to obtain chemically-pure potash, may be precipitated by gradually adding a solution of carbonate of potash.

The application of the unlixiviated mixture as a manure and its advantages are fully stated. It may be used either by itself or as the basis of a manure combined with other substances to suit particular soils, and it has also been stated that soda feldspar can be treated in a manner similar to potash feldspar for the purpose of obtaining caustic or carbonate of soda.

Having thus described my process, what I claim as my invention is—

The decomposing of feldspar by heating it with lime and phosphate of lime for the purpose of obtaining potash or soda, either in the caustic or carbonated state, or for the purpose of obtaining a manure, in the manner substantially as above described.

CHARLES BICKELL.

Witnesses:
FREDERICK KRAUSE,
FRANCIS A. KOEHLER.